United States Patent [19]

Gupta

[11] 4,159,519
[45] Jun. 26, 1979

[54] TEMPLATE FAMILY INTERFACING STRUCTURE FOR PROVIDING A SEQUENCE OF MICROINSTRUCTIONS TO A PIPELINED MICROPROGRAMMABLE DATA PROCESSING SYSTEM

[75] Inventor: Ram K. Gupta, Norristown, Pa.
[73] Assignee: Burroughs Corporation, Detroit, Mich.
[21] Appl. No.: 853,518
[22] Filed: Nov. 21, 1977
[51] Int. Cl.² .......................... G06F 9/16; G06F 13/00
[52] U.S. Cl. .................................................. 364/200
[58] Field of Search ... 364/200 MS File, 900 MS File, 364/736

[56] References Cited
U.S. PATENT DOCUMENTS

| | | | |
|---|---|---|---|
| 3,634,828 | 1/1972 | Myers et al. | 364/200 |
| 3,875,391 | 4/1975 | Shapiro et al. | 364/200 X |
| 4,038,643 | 7/1977 | Kim | 364/200 |

Primary Examiner—Melvin B. Chapnick
Attorney, Agent, or Firm—Edward J. Feeney, Jr.; Edmund M. Chung; Leonard C. Brenner

[57] ABSTRACT

In a microprogrammed pipelined data processing system, a template family interfacing structure sequences a plurality of templates to the pipelined system for control thereof, each template therein comprising a set of microinstructions for controlling each stage in the pipelined system. The templates are stored in a template micromemory system addressed by an address register and read to a control register. Parameters, grouped into template "Families", of the next template to be used and family parameters of the current template in use are utilized in conjunction to control the initiation of the next template to avoid conflict in any stage in the pipelined system.

4 Claims, 11 Drawing Figures

Fig. 3

| | TIME | | | | | | | | |
|---|---|---|---|---|---|---|---|---|---|
| | 1 | 2 | 3 | 4 | 5 | 6 | 7 | 8 | 9 |
| STAGE 1 | P | Q | R | X | | | | | S |
| STAGE 2 | | P | Q | R | 25 | | | | |
| STAGE 3 | | | | + | + | * | * | | |
| STAGE 4 | | | | | 23 | | | S | |

[SA70]         TRIAD(3,4)

Fig. 4

| | TIME | | | | | | | | |
|---|---|---|---|---|---|---|---|---|---|
| | 1 | 2 | 3 | 4 | 5 | 6 | 7 | 8 | 9 |
| STAGE 1 | E | F | G | X | | | | | T |
| STAGE 2 | | E | F | G | 25 | | | | |
| STAGE 3 | | 23 | | X | + | + | * | * | |
| STAGE 4 | | | | X | | | | T | |

[SA75]         TRIAD(4,8)

Fig. 11

| | TIME | | | | | | | | | | | | | | | | | | | | | | | | |
|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| STAGE 1 | A | B | X | P | Q | R | Z | E | F | G | | S | P | Q | R | T | E | F | G | | S | | | | T |
| STAGE 2 | | A | B | 25 | P | Q | R | | E | F | G | | | P | Q | R | | E | F | G | | | | | |
| STAGE 3 | | | | + | + | 23 | + | + | * | 23 * | + | + | * | | + | + | * | 23 * | + | + | * | * | | | |
| STAGE 4 | | | | | 23 | Z | | | 25 | S | | 25 | | T | 23 | | | 25 | S | | 25 | | T | | |

| FF | EBF | LOAD |
|---|---|---|
| 1 | 0 | 1 |
| 2 | 0 | 1 |
| 3 | 0 | 1 |
| 4 | 0 | 1 |
| 1 | 1 | 1 |
| 1 | 2 | 0 |
| 1 | 3 | 0 |
| 1 | 4 | 0 |
| 1 | 8 | 0 |
| 1 | 15 | 0 |
| 2 | 1 | 0 |
| 2 | 2 | 1 |
| 2 | 3 | 0 |
| 2 | 4 | 0 |
| 2 | 8 | 0 |
| 2 | 15 | 0 |
| 3 | 1 | 0 |
| 3 | 2 | 0 |
| 3 | 3 | 1 |
| 3 | 4 | 0 |
| 3 | 8 | 0 |
| 3 | 15 | 0 |
| 4 | 1 | 0 |
| 4 | 2 | 0 |
| 4 | 3 | 0 |
| 4 | 4 | 1 |
| 4 | 8 | 0 |
| 4 | 15 | 0 |
| 8 | 1 | 0 |
| 8 | 2 | 0 |
| 8 | 3 | 0 |
| 8 | 4 | 0 |
| 8 | 8 | 1 |
| 8 | 15 | 0 |

TABLE 2

| (ADDRESS) FS | (OUTPUT) FSIN | (OUTPUT) EBFIN |
|---|---|---|
| 0 | 0 | 0 |
| 1 | 15 | 15 |
| 2 | 1 | 1 |
| 3 | 2 | 2 |
| 4 | 3 | 3 |
| 8 | 16 | 15 |
| 15 | 0 | 0 |
| 16 | 3 | 3 |
| ALL OTHERS | DON'T CARE | DON'T CARE |

TABLE 1

| CYCLE | -1 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|---|
| ADDRESS A | 0 | 80 | 81 | 82 | 70 | 71 | 72 | 73 | 75 | 76 | 77 | 0 | 0 | 70 | 71 | 72 | 73 | 75 | 76 | 77 | 0 | 0 | 0 | 0 | 0 | 0 | 0 |
| FRONT FAMILY FF | 2 | 0 | 3 | 3 | 0 | 4 | 4 | 4 | 0 | 3 | 3 | 3 | 3 | 0 | 4 | 4 | 4 | 0 | 0 | 0 | 0 | 0 | 0 | 0 | 0 | 0 | 0 |
| E-BACK FAMILY EBF | 0 | 0 | 15 | 3 | 2 | 15 | 15 | 4 | 3 | 15 | 3 | 3 | 3 | 2 | 15 | 15 | 4 | 3 | 15 | 8 | 15 | 3 | 2 | 1 | 15 | 0 | 0 |
| FAMILY STATE FS | 0 | 0 | 15 | 3 | 2 | 15 | 15 | 4 | 3 | 15 | 8 | 16 | 3 | 2 | 15 | 15 | 4 | 3 | 15 | 8 | 16 | 3 | 2 | 1 | 15 | 0 | 0 |
| FAMILY CONTROL FC | 0 | 15 | 3 | 0 | 15 | 15 | 4 | 0 | 15 | 8 | 0 | 0 | 0 | 15 | 15 | 4 | 0 | 8 | 0 | 0 | 0 | 0 | 0 | 0 | 0 | 0 | 0 |
| NEXT TEMPLATE NT | 1 | 0 | 1 | 1 | 0 | 1 | 1 | 1 | 0 | 1 | 1 | 1 | 1 | 0 | 1 | 1 | 1 | 0 | 0 | 0 | 0 | 0 | 0 | 0 | 0 | 0 | 0 |

TABLE 3

TEMPLATE FAMILY INTERFACING STRUCTURE FOR PROVIDING A SEQUENCE OF MICROINSTRUCTIONS TO A PIPELINED MICROPROGRAMMABLE DATA PROCESSING SYSTEM

REFERENCE TO RELATED APPLICATIONS

In co-pending application, Ser. No. 782,374 for a "Scientific Processor", filed Mar. 29, 1977, in the name of Richard A. Stokes et al, and assigned to the assignee of the present invention, there is described and claimed a scientific processor utilizing a parallel pipeline array under template control. Although not limited thereto, the present template micromemory system invention may be applied to the pipeline array disclosed therein. Further, in co-pending application, Ser. No. 838,070 for a "Template Micromemory Structure" filed in the names of R. K. Gupta and C. R. Vora, there is described and claimed a template micromemory storage apparatus. Although not limited thereto, the present invention employs in its preferred embodiment such apparatus.

BACKGROUND OF THE INVENTION

In the area of data processors, a pipeline system is a system having computational and combinational capabilities divided into several sequential stages, each of which may be active with an independent set of data at the same instant of time. Data is viewed as flowing from one pipeline stage where it is acted upon or processed to another for further action or processing. To increase pipeline throughput new data is fed to the first stages thereof while old data is still being acted upon in the latter stages. Maximum throughput wherein all stages are busy all of the time is a goal seldom achieved in any pipeline system over an extended period of time.

Often the pipeline system is microprogrammable wherein each stage thereof responds to microinstructions. For example, an arithmetic element stage may respond to microinstructions requesting arithmetic operations such as add, divide, multiply, etc., and to other control instructions requesting Boolean operations to be performed. A simple memory stage may be requested by a control microinstruction to read from a particular address, and to output to a particular bus, register or stage, or to store data in a particular address. In microprogrammable pipeline system design striving to maximize throughput, the task of providing the proper control microinstructions to the various stages in correct sequential order becomes quite complex, see "The Microprogramming of Pipelined Processors", P. M. Kogge, "THE FOURTH ANNUAL SYMPOSIUM ON COMPUTER ARCHITECTURE", pp 63-69.

Additional problems in microprogrammably controlling pipeline stages occur when feedback flow within and among the stages is allowed. Feedback flow allows data to be fully processed in one complete flow through the pipeline and eliminates the need for duplicate stages in the pipeline, which stages may be required by only a small percentage of the data flowing therethrough.

A set of microinstructions controlling the flow of an individual set of data through the pipeline is a template. The overall flow of data through the pipeline then becomes controlled by a sequence of templates. The templates must be stored and fed to the pipeline stages in a manner to avoid collisions. This becomes particularly important and increasingly difficult in situations involving pipeline feedback.

Thus, the controlling system for initiating and sequencing templates must be capable of initiating templates sequentially in a manner to produce high pipeline throughput without collisions. A prior microprogrammed pipeline controlling system has been proposed using shift registers, see E. S. Davidson et al, "Effective Control for Pipelined Computers", Proc. Compcon, Spring 1975, pp. 181-184. However, such a shift register controlling scheme becomes increasingly expensive for multiple template pipelined systems and the addition of new templates requires hardwire logic modifications. in the template control system design.

It is therefore an object of the invention to provide an efficient template initiation and sequencing control method and apparatus for a microprogrammed pipelined data processing system.

It is another object of the present invention to provide an improved template control system that can accept new templates without requiring hardwire modifications.

SUMMARY OF THE INVENTION

The above and other objects of the invention are realized in a template family interfacing system for sequencing templates to a microprogrammed pipelined data processing system for control thereof wherein the template family interfacing system includes an addressable template micromemory system for storing templates and for providing same to the pipelined system. Parameters (grouped into template "families") of the next template to be used and family parameters of the current template in use are utilized in conjunction to control the initiation of the next template to avoid conflict in any stage in the pipelined system. The utilization of the template family parameter occurs primarily in two programmable read-only memories (PROM's ) which are in essence addressed by the family parameters and output control signals affecting template sequencing.

The system configuration and operational details given above have been presented in simplified form. Other features of the invention will become more fully apparent in the detailed description presented hereinafter.

BRIEF DESCRIPTION OF THE DRAWING

FIG. 3 is an example of one TRIAD template for use in the present invention;

FIG. 4 is an example of another TRIAD template for use in the present invention;

FIG. 11 is a presentation showing the sequencing and interfacing of templates as controlled by the system of FIG. 5;

Figure 5:
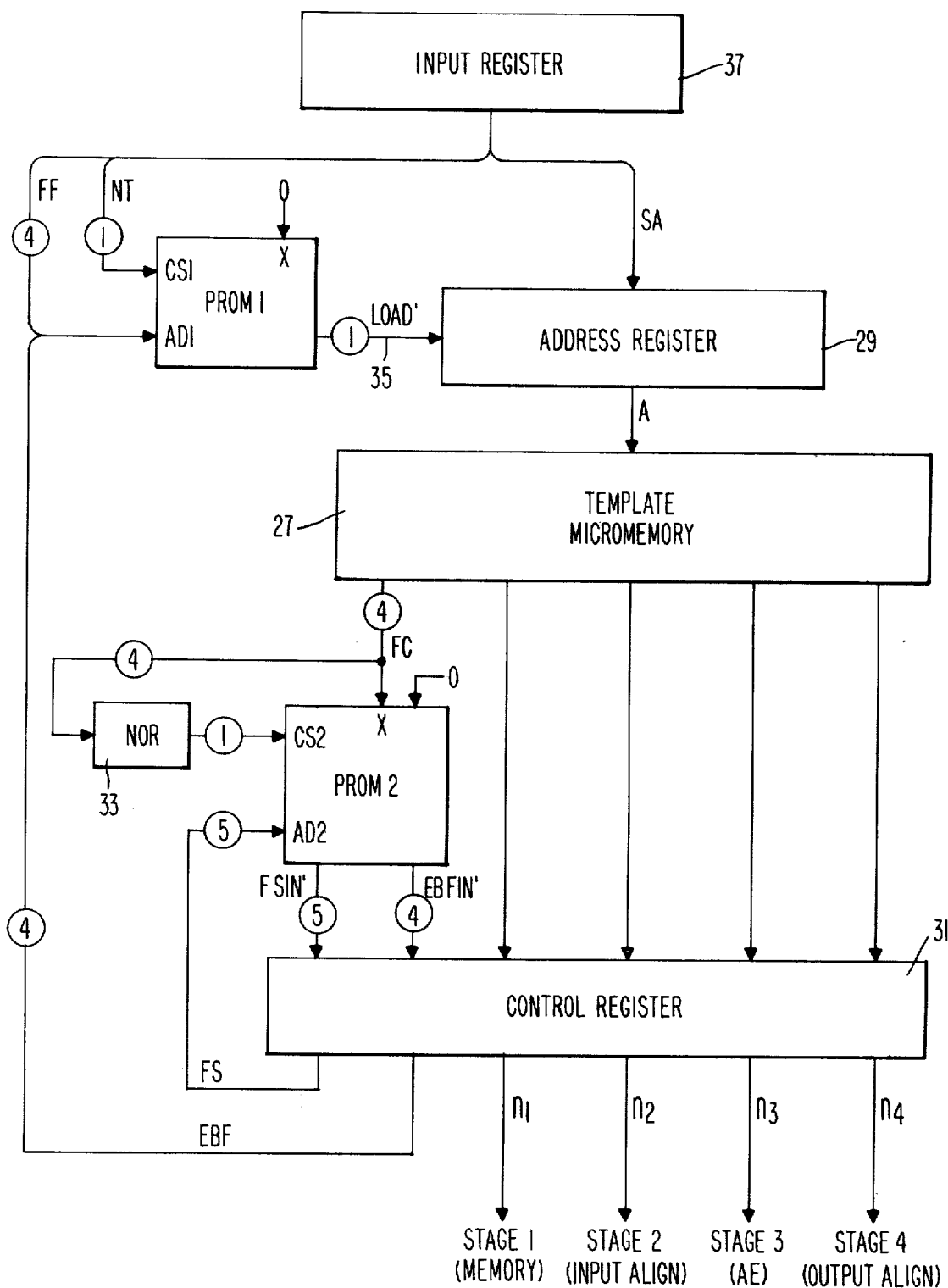
FIG. 5 is a diagram of storage and logic elements used for sequencing and interfacing templates of the type shown in FIGS. 3 and 4 to the pipelined system of FIG. 1.

Table 1 is a tabular presentation of the programming of the PROM 2 used in the system of FIG. 5;

Table 2 is a tabular presentation of the programming of the PROM 1 used in the system of FIG. 5; and Table 3 is a tabular detailing of template parameters as sequenced and interfaced by the system of FIG. 5 in accord with the pattern of FIG. 11.

DESCRIPTION OF THE PREFERRED EMBODIMENT

Figure 1:
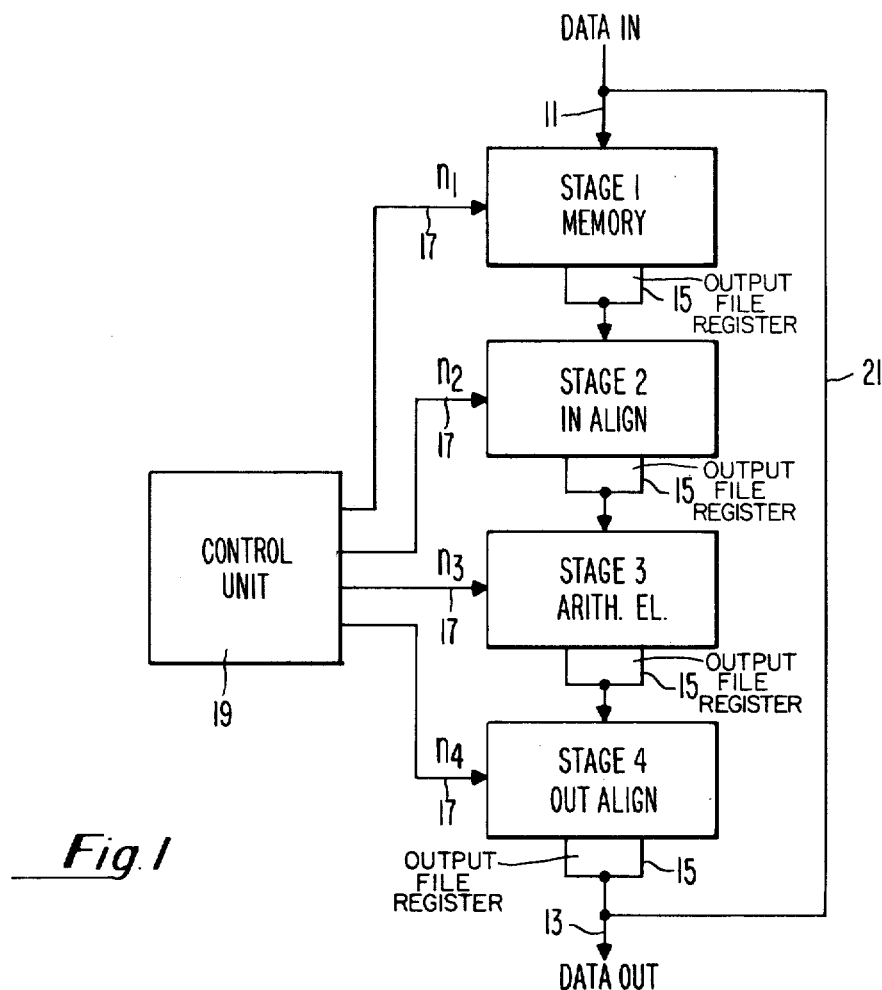
FIG. 1 is a block diagram illustrating the microprogrammed pipelined data processing system environment of the present invention.

The pipeline template family structure of the preferred invention functions to control and process the flow of data through a plurality of microprogrammable stages, see FIG. 1. Data is inputted into Stage 1 through data input channel 11 and pipelined successively through Stages 2, 3 and 4 to data output channel 13. A feedback path 21 permits recycling of data to Stage 1. Each Stage 1-4 has an associated output file register 15 to facilitate data flow to the successive stage or to the data output channel 13. Each Stage 1-4 also includes a control input 17 for received microcoded instructions nl through n4 respectively, from a controlling unit 19.

In co-pending application Ser. No. 682,586, now U.S. Pat. No. 4,051,551, for a "Multidimensional Parallel Access Computer Memory", filed May 3, 1976 in the name of D. H. Lawrie et al and assigned to the assignee of the present invention, Stages 1 through 4 of the present invention are realized as the memory, input alignment, processing and output alignment stages of a parallel processor. The present invention may be employed with either parallel or serial processors, as long as each stage thereof is microprogrammable and all stages together function in a pipelined function regarding data flow and processing.

Each pipeline Stage 1-4 responds to microcoded instructions applied to its control input 17. For example, microcode instruction nl may direct Stage 1 to store data from the data input channel 11 or to transfer data to Stage 2. The address of the data to be stored or transferred need not be supplied with the code instruction nl as the address may readily be supplied from some other source (not shown).

Figure 2:
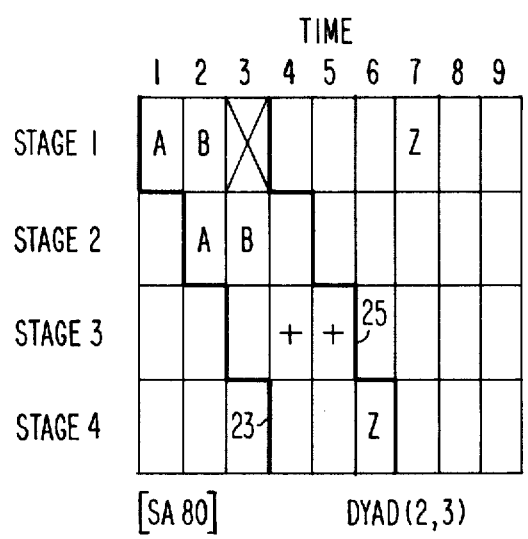
FIG. 2 is an example of a DYAD template for use in the present invention.

Data flows through Stages 1 through 4 in the pipeline system shown in FIG. 1 under the control of a template of the type illustrated in FIG. 2. With reference to FIG. 2, a template DYAD (2,3) occupies cycle time 1-3 and 7 for Stage 1, time 2-3 for Stage 2, time 4-5 for Stage 3, and time 6 for Stage 4. The illustrative template DYAD (2,3) controls the following operations in the pipeline system of FIG. 1:

(a) Fetch an operand A from memory (Stage 1) during cycle time 1;

(b) Fetch an operand B from memory (Stage 1) and input align (Stage 2) operand A during cycle time 2;

(c) Input align (Stage 2) operand B during cycle time 3;

(d) Perform (Stage 3) first cycle of ADD operation with operands A and B during cycle time 4;

(e) Perform (Stage 3) final cycle of ADD operation during cycle time 5. (For purposes of illustration, a two cycle ADD operations has been shown);

(f) Perform output align (Stage 4) during cycle time 6; and (g) Store result $Z$ ($Z = A + B$) in memory (Stage 1) during cycle time 7.

Figure 6:
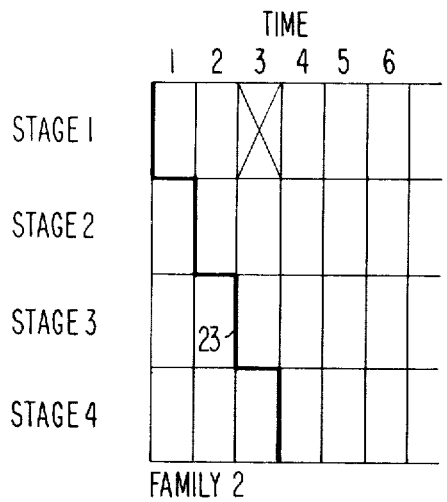
FIG. 6 is an example of template family 2 useable in the system of FIG. 5.
Figure 7:
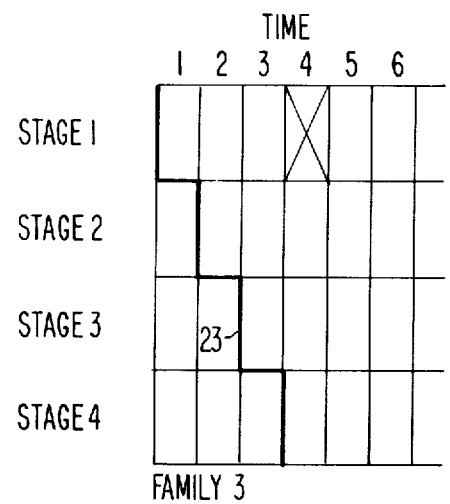
FIG. 7 is an example of the template family 3 useable in the system of FIG. 5.
Figure 8:
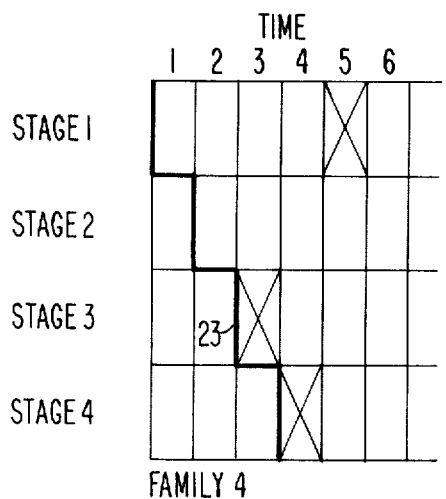
FIG. 8 is an example of template family 4 useable in the system of FIG. 5.
Figure 9:
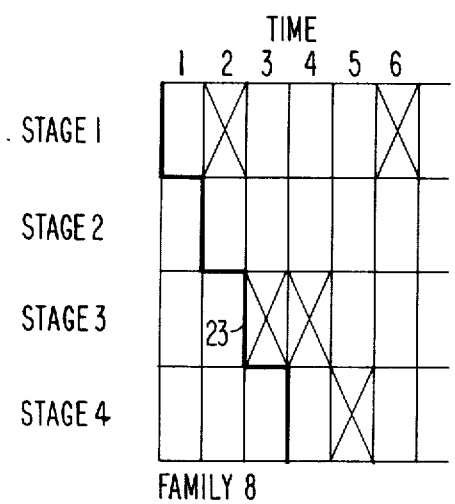
FIG. 9 is an example of template family 8 useable in the system of FIG. 5.
Figure 10:
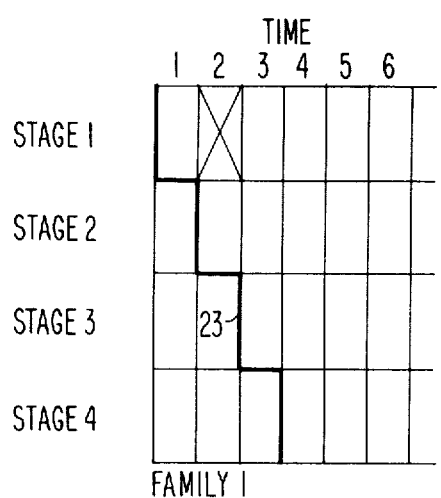
FIG. 10 is an example of template family 1 useable in the system of FIG. 5.

Note that the illustrative template DYAD (2,3) is bounded by a front diagonal line 23 and a rear diagonal line 25. As will be detailed hereinafter, the front diagonal 23 pattern is associated with a template family type 2 (see FIG. 6) and the rear diagonal 25 pattern is associated with a template family type 3 (see FIG. 7), hence the template descriptor DYAD (2,3). Likewise, a template TRIAD (3,4) may be fashioned to perform the task $S = (P+Q) \cdot R$, see FIG. 3. Also, a template TRIAD (4,8) may be fashioned to perform the task $T = (E+F) \cdot G$, see FIG. 4.

Templates are stored in an addressable micromemory store 27 to be provided automatically and sequentially to the Stages 1-4 of the pipeline system of FIG. 1, see FIG. 5. Various embodiments for the template micromemory store 27 are shown and described in U.S. Patent application Ser. No. 838,070 filed Nov. 17, 1977 for a "Template Micromemory Structure", in the names of R. Gupta and C. Vora and assigned to the assignee of the present invention. As detailed therein, the template micromemory 27 generates control bits for all stages of the pipeline system of FIG. 1 given the address of the microword for Stage 1.

The template micromemory 27 is addressed by address register 29 which temporarily stores the address for sequentially addressing the template micromemory store 27.

The control register 31 latches the control bits n1-n4 before they are applied to pipeline Stages 1-4. The control register 31 likewise latches 4 bits designated EBFIN' (for Effective Back Family in) and 5 bits are designated FSIN' for (Family State In). These 9 bits (EBFIN' and FSIN') are outputted from a programmable read-only memory designated PROM 2. The PROM 2 is addressed by 5 bits designated FS (for Family State) which are in essence the 5 bits of FSIN' after being latched by the control register 31 for subsequent template execution.

The PROM 2 functions under the control of 4 control bits designated FC for Family Control. The FC bits are stored in the template micromemory 27 with the n1 control bits for pipeline Stage 1. The four FC bits outputted from the template micromemory 27 feed through a NOR circuit 33 to a chip select input CS2 on the PROM 2 to effectuate control thereof. The FC bits are also applied to the PROM 2 extension input X. In operation then FSIN' equals [c(FSIN)·CS2] OR (0:FC) wherein (0:FC) implies that the most significant bit is 0 and the remaining bits equal the FC bits and wherein c(FSIN) is data stored in PROM 2 at address FS. Likewise, EBFIN' equals [c(EBFIN)·CS2)] or (FC). The FSIN and EBFIN bits are programmed into PROM 2 at the addresses designated by the FS bits as applied to the address input AD2 of PROM 2, see Table 1. Note that all FC bits must equal logical zero in order to activate PROM 2 via CS2.

The four EBF bits being in essence the four EBFIN' bits after latching by control register 31 are fed to the address input AD1 of PROM 1. PROM 1 has a single output line 35 which is fed to address register 29. When the logic level output line 35 is at a logical 1 level, the address register 29 accepts a starting address (SA) from an input register 37. The starting address SA is the address in the template micromemory 27 at which a template is initiated. Thereafter, during template pendancy, the address register 29 is positively incremented each cycle. For example, as shown in FIG. 2, a DYAD (2,3) starts at address 80 and is incremented thereafter.

The input register 37 therefore temporarily stores the starting address SA sequentially of each template to be executed. Also temporarily stored in the input register 37 is a single bit NT indicating by a logical 1 level that the next template is currently stored in the input register 37 ready for transfer to the address register 29. The next template bit NT is fed to the chip select input CS1 of PROM 1 to effectuate control thereof. Finally, the input register 37 also temporarily stores and feeds to the address input AD1 of PROM 1 four bits designating the front family FF of the next template (NT) stored therein. The four bit front family FF combines with the four bit effective back family EBF to provide the total address input to AD1. The Output Load' fed to address register 29 is equal to LOAD·CS1 wherein LOAD is the logical value stored at the address designated by the combined front family FF bits and the effective back family EBF bits, see Table 2.

The extension of input X of PROM 1 is effectively not employed by providing a fixed logical 0 to the input thereof.

Various template family structures may be fashioned as illustrated by the FIGS. 6 through 10, respectively detailing families 2, 3, 4, 8 and 1. In each of the Figures an "x" in a Stage-time block indicates that the template does not occupy that block.

In operation a template sequence may be processed expeditiously, see FIG. 11. With reference to FIG. 11 a template sequence is illustrated comprising DYAD (2,3), TRIAD (3,4), TRIAD (4,8), TRIAD (3,4) and TRIAD (4,8). For such a sequence a table of operating parameters may be constructed. See Table 3 giving cycle-by-cycle details of the five operating parameters address A, front family FF, effective back family EBF, family status FS, and family control FC.

The above description has been of one embodiment only by way of example and it should be appreciated by those skilled in the art that a number of modifications can be made without departing from the scope of the invention.

For example, the control register may be deleted if desired and the control microwords n1 through n4 may be fed directly to the microprogrammed data processing pipelined system. Storage devices in function equivalent to the PROMs may be employed in their stead and other storage and logic means functionally equivalent to those shown and described may be employed as is well known in the art. Additional template families may be devised in accord with the method and apparatus above-described. Thus, it is understood that the above description has been presented and should be interpreted in the illustrative and not the limiting sense.

What is claimed is:

1. A template interfacing apparatus for sequentially providing microinstructions to a microprogrammed pipelined data processing system, said template interfacing apparatus comprising:

template micromemory means for addressably storing a plurality of templates, each template therein comprising a series of addressable microinstructions, each said series having a starting microinstruction address, each said addressable microinstruction therein further including template family control information;

address means for addressing said template micromemory means to sequentially read out therefrom said plurality of templates, said address means loadable to said starting microinstruction address of an individual template in said plurality thereof and incrementable thereafter for sequencing through said series of microinstructions of said individual template;

input means for providing said starting microinstruction address of a next individual template to said address means, said input means also providing an next individual template indication for indicating that said starting microinstruction address of said next individual template is ready for loading into said address means, and said input means also for providing front family parameter information concerning said next individual template associated with said starting microinstruction address ready for loading into said address means;

control means responsive to the template family control information associated with the microinstruction most recently read from said template micromemory means and to said front family parameter information provided by said input means for providing said next individual template starting address from said input means to said address means when said next template indication is provided by said control means and said template family control information associated with said microinstruction most recently read from said template micromemory means and said front family parameter information provided by said input means indicate that such loading of said next individual template will be interference-free with regard to individual templates being read from said template micromemory means; and means connected between said template micromemory means and said microprogrammed pipelined data processing system for transferring microinstructions read from said template micromemory means to said microprogrammed pipelined data processing system.

2. The template interfacing apparatus according to claim 1 wherein:

said control means includes load memory means for providing a load control signal to said address means to effectuate the transfer of said starting microinstruction address from said input means to said address means, said load memory means being activated by said next individual template indication from said input means and addressed by said front family parameter information from said input means and by said template family control information from said template micromemory means.

3. The template interfacing apparatus according to claim 2 wherein said load memory means includes a read-only memory having an output for providing said load control signal to said address means to effectuate the loading of said next template from said input means to said address means.

4. The template interfacing apparatus according to claim 1 wherein said transferring means includes a control register for temporarily storing microinstructions provided from said template memory means to said microprogrammed pipelined data processing system.

* * * * *